United States Patent
Shappee

(10) Patent No.: US 7,853,942 B2
(45) Date of Patent: Dec. 14, 2010

(54) SIEBEL SPF TEMPLATE FILE UPDATE UTILITY

(75) Inventor: Thomas B. Shappee, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 973 days.

(21) Appl. No.: 11/675,220

(22) Filed: Feb. 15, 2007

(65) Prior Publication Data

US 2008/0201692 A1 Aug. 21, 2008

(51) Int. Cl.
G06F 9/44 (2006.01)
G06F 7/00 (2006.01)
G06F 17/00 (2006.01)

(52) U.S. Cl. ............... 717/170; 717/169; 715/235; 715/236; 715/962; 707/695; 707/696; 707/697

(58) Field of Classification Search ......... 717/168–173; 715/234–236, 961–962; 707/694–697
See application file for complete search history.

(56) References Cited

U.S. PATENT DOCUMENTS

| | | | | |
|---|---|---|---|---|
| 6,085,201 A * | 7/2000 | Tso | ............................. | 715/205 |
| 7,134,084 B1 * | 11/2006 | Rashid et al. | ............... | 715/762 |
| 2002/0143692 A1 * | 10/2002 | Heimermann et al. | .......... | 705/37 |
| 2004/0162800 A1 * | 8/2004 | Reid et al. | .................... | 707/1 |
| 2005/0050454 A1 * | 3/2005 | Jennery et al. | .............. | 715/513 |

OTHER PUBLICATIONS

Jern et al., "Import of Company Data into a Customer Relationship Management System"; 2007, Helsinki University of Technology, 17pg.*
Overby, Stephanie; "The Truth About On-Demand CRM"; 2006, CIO Magazine; 8pg.*
Rosenbaum et al., "Usability in Practice: User Experience Lifecycle—Evolution and Revolution"; 2002, ACM; 6pg.*

* cited by examiner

*Primary Examiner*—Wei Y Zhen
*Assistant Examiner*—Ryan D Coyer
(74) *Attorney, Agent, or Firm*—John R. Pivnichny; Hoffman Warnick LLC

(57) ABSTRACT

The present invention is directed to a Siebel SPF template file update utility. A method for updating a template file in accordance with an embodiment of the present invention includes: obtaining a template file, an existing row_id, and a target row_id; scanning the template file for section markers; locating an encoded length of a section of the template file using a section marker; decoding the encoded length of the section to obtain a section length; reading the section in its entirety using the section length; scanning the section to locate each instance of the existing row_id; replacing each instance of the existing row_id with the target row_id; and recalculating and re-encoding the section length. This process is repeated for each additional section marker.

8 Claims, 1 Drawing Sheet

SIEBEL SPF TEMPLATE FILE UPDATE UTILITY

BACKGROUND OF THE INVENTION

1. Field of the Invention

The present invention generally relates to management software. More specifically, the present invention is directed to a Siebel Preference File (SPF) template file update utility.

2. Related Art

Customer Relationship Management (CRM) is an industry term for software applications that help enterprise businesses manage customer relationships in an organized way. An example of a CRM application would be a database containing detailed customer information that management and salespeople can reference in order to match customer needs with products, inform customers of service requirements, etc. Siebel is a commonly used brand of CRM software (Siebel is a registered trademark of Oracle Corporation and/or its affiliates in the United States and/or other countries).

Siebel SPF files are UTF-16LE files with embedded row ids and checksums used to store user preferences such as View Lists, Tab Layouts, etc. These files are used to control the layout of the Siebel GUI for individual users. In order to be able to use an existing SPF file as a template for other users, the embedded user row ids within the SPF file must be replaced with the target user's id and all checksums for each category must be updated. No known automated solutions exist for modifying a given SPF file for a particular Siebel user.

SUMMARY OF THE INVENTION

The present invention is directed to a Siebel SPF template file update utility.

A first aspect is directed to method for updating a template file, comprising: obtaining a template file, an existing row_id, and a target row_id; scanning the template file for section markers; locating an encoded length of a section of the template file using one of the section markers; decoding the encoded length of the section to obtain a section length; reading the section in its entirety using the section length; scanning the section to locate each instance of the existing row_id; replacing each instance of the existing row_id with the target row_id; and recalculating and re-encoding the section length.

A second aspect is directed to template updating utility, comprising: a system for obtaining a template file, an existing row_id, and a target row_id; a system for scanning the template file for section markers; a system for locating an encoded length of a section of the template file using one of the section markers; a system for decoding the encoded length of the section to obtain a section length; a system for reading the section in its entirety using the section length; a system for scanning the section to locate each instance of the existing row_id; a system for replacing each instance of the existing row_id with the target row_id; and a system for recalculating and re-encoding the section length.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
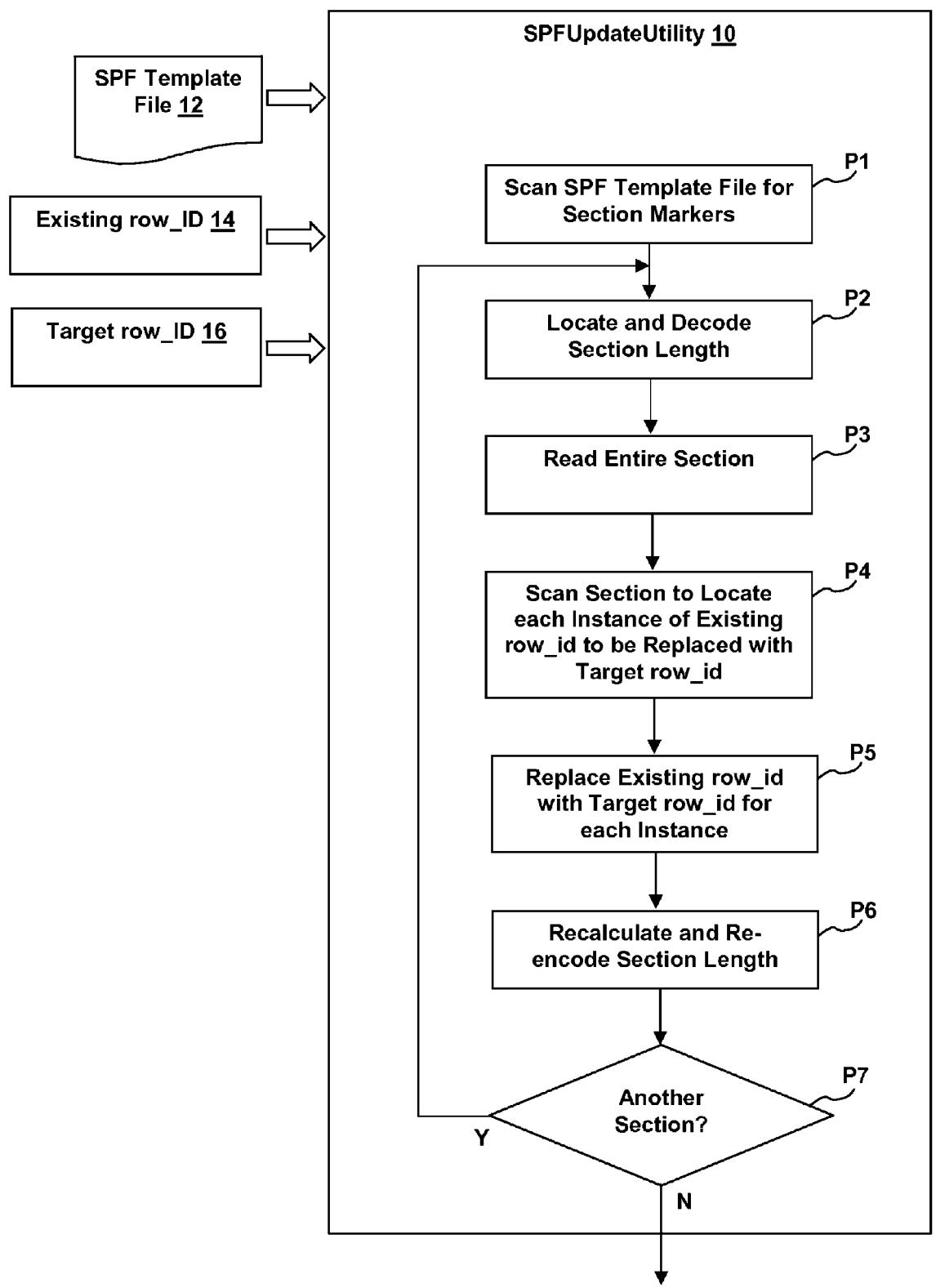
FIG. 1 depicts a Siebel SPF template file update utility in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The present invention provides a Siebel SPF template file update utility (SPFUpdateUtility). The SPFUpdateUtility code provides an automated solution for modifying a given SPF template file for a particular Siebel user. This enables the ability to provide a mass audience of Siebel users with a consistent set of preferences based on a SPF template file.

The SPFUpdateUtility is a Java program used to modify a given SPF template file for a particular Siebel user (Java and all Java-based trademarks are trademarks of Sun Microsystems, Inc. in the United States, other countries, or both). Used in conjunction with other scripting, the SPFUpdateUtility allows for mass numbers of Siebel users to inherit the preferences from a given SPF template file.

As depicted in FIG. 1, the SPFUpdateUtility 10 accepts three arguments: 1) the SPF template file 12 to be updated; 2) the existing row_id 14 in the SPF template file 12 to be replaced; and 3) the target row_id 16 which is to replace the existing row_id 14. Because the SPFUpdateUtility 10 is provided in Java, it can be run on multiple platforms including Windows (Windows is a trademark of Microsoft Corporation in the United States, other countries, or both), UNIX (UNIX is a registered trademark of The Open Group in the United States and other countries), and any other operating systems with a compliant Java runtime.

The SPFUpdateUtility 10 code scans (P1) the SPF template file 12 looking for hexadecimal codes used as section markers. Following each section marker is the encoded length of the section, which is located and decoded (P2) by the SPFUpdateUtility 10. The SPFUpdateUtility 10 reads (P3) the section in its entirety using the length of the section determined in (P2). The section is then scanned (P4) by the SPFUpdateUtility 10 to locate each instance of the existing row_id 14 that is to be replaced. For each instance found, the SPFUpdateUtility 10 replaces (P5) the existing row_id 14 with the target row_id 16. The section length is then recalculated and re-encoded (P6) by the SPFUpdateUtility 10. This process is repeated (P7) for each section in the SPF template file 12. Upon completion of this process, the content of the SPF template file 12 has been updated to reflect the new target row_id 16. It should be noted that (P1) to (P7) are intended to represent method steps, system components, and/or program code configured to implement the SPFUpdateUtility 10 of the present invention The SPFUpdateUtility 10 can be used on its own to provide a small number of updates to an SPF template file 12. The SPFUpdateUtility 10 can be used in conjunction with one or more additional scripts to provide updates to an SPF template file 12 for large number of users.

Some/all aspects of the present invention can be provided on a computer-readable medium that includes computer program code for carrying out and/or implementing the various process steps of the present invention, when loaded and executed in a computer system. It is understood that the term "computer-readable medium" comprises one or more of any type of physical embodiment of the computer program code. For example, the computer-readable medium can comprise computer program code embodied on one or more portable storage articles of manufacture (e.g., a compact disc, a magnetic disk, a tape, etc.), on one or more data storage portions of a computer system, such as memory and/or a storage system (e.g., a fixed disk, a read-only memory, a random access memory, a cache memory, etc.), and/or as a data signal traveling over a network (e.g., during a wired/wireless electronic distribution of the computer program code).

It should be appreciated that the teachings of the present invention could be offered as a business method on a subscription or fee basis. For example, a service provider can create, maintain, enable, and deploy an audience response detection interactive presentation tool, as described above.

The foregoing description of the embodiments of this invention has been presented for purposes of illustration and description. It is not intended to be exhaustive or to limit the invention to the precise form disclosed, and many modifications and variations are possible.

What is claimed is:

1. A method for updating a template file, comprising:
    obtaining a template file, an existing user row_id, and a target user row_id, wherein the template file is a Siebel Preference File (SPF) corresponding to an existing user;
    scanning the template file for section markers;
    locating an encoded length of a section of the template file using one of the section markers;
    decoding the encoded length of the section to obtain a section length;
    reading the section in its entirety using the section length;
    scanning the section to locate each instance of the existing user row_id;
    replacing each instance of the existing user row_id with the target user row_id; and
    recalculating and re-encoding the section length.

2. The method of claim 1, further comprising repeating the method for each additional section marker.

3. The method of claim 1, wherein the template file forms part of a client relationship management application.

4. The method of claim 1, wherein the template file is updated using a Java program.

5. A template updating utility, comprising:
    a computer system comprising memory coupled to a processor;
    a system for obtaining a template file, an existing user row_id, and a target user row_id, wherein the template file is a Siebel Preference File (SPF) corresponding to an existing user;
    a system for scanning the template file for section markers;
    a system for locating an encoded length of a section of the template file using one of the section markers;
    a system for decoding the encoded length of the section to obtain a section length;
    a system for reading the section in its entirety using the section length;
    a system for scanning the section to locate each instance of the existing user row_id;
    a system for replacing each instance of the existing user row_id with the target user row_id; and
    a system for recalculating and re-encoding the section length.

6. The utility of claim 5, wherein the utility is configured to update each section of the template file identified by a section marker.

7. The utility of claim 5, wherein the template file forms part of a client relationship management application.

8. The utility of claim 5, wherein the template file is updated using a Java program.

* * * * *